C. H. CALKINS.
COMPOSITE GEAR.
APPLICATION FILED AUG. 18, 1916.
1,316,270.  
Patented Sept. 16, 1919.
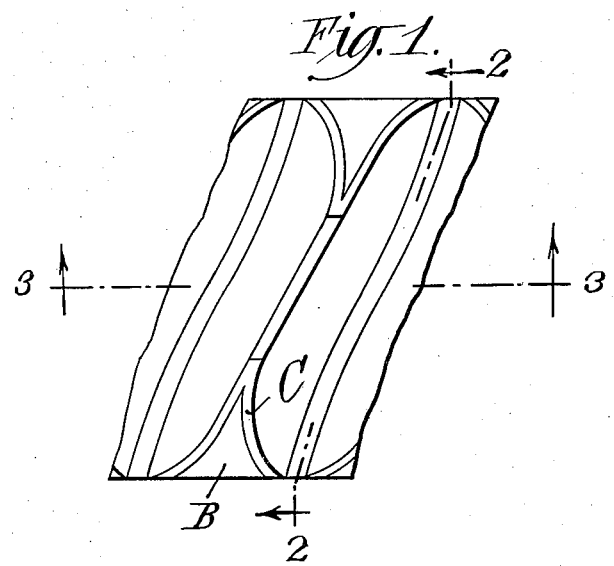
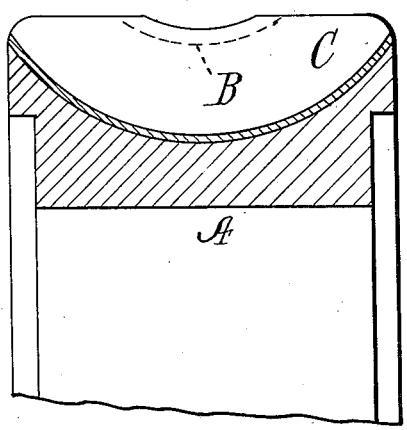
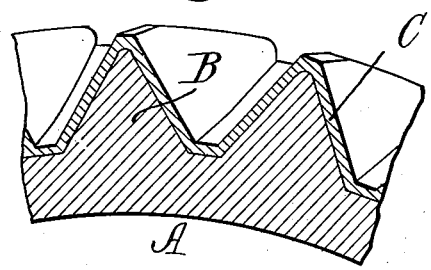
Charles H. Calkins, INVENTOR.
BY
D. Anthony Usina, ATTORNEY

UNITED STATES PATENT OFFICE.

CHARLES H. CALKINS, OF LUDLOW, MASSACHUSETTS, ASSIGNOR TO BAUSH MACHINE TOOL COMPANY, A CORPORATION OF MASSACHUSETTS.

COMPOSITE GEAR.

1,316,270. Specification of Letters Patent. Patented Sept. 16, 1919.

Original application filed March 22, 1916, Serial No. 85,809. Divided and this application filed August 18, 1916. Serial No. 115,669.

*To all whom it may concern:*

Be it known that I, CHARLES H. CALKINS, a citizen of the United States, residing in Ludlow, Massachusetts, have invented certain new and useful Improvements in Composite Gears, of which the following is a specification.

In my application Serial No. 85,809, filed March 22, 1916, I have described and claimed certain improvements applicable to gears generally and particularly advantageous in the the manufacture of worm gears. The present application is a division thereof. The accompanying drawings illustrate an embodiment of the invention.

Figures 1, 2 and 3 are respectively a plan and sections on the lines indicated.

Referring to the embodiments of the invention illustrated, the center A of the gear is of a comparatively strong metal such as iron, using the word in its general sense to include all suitable varieties of iron and steel. The center has stub teeth B thereon, made for example by casting the center and its stub teeth integrally of cast iron.

The stub teeth B are faced with material C, such as bronze, weaker than the center but constituting a better antifriction surface, and cast or plated or otherwise laid on preferably though not necessarily in a sheet or film extending unbrokenly around the center, as illustrated. The bronze facing may also be welded to the stub teeth or to any other part of the center. In fact supplementary means of any suitable sort may be used to fix the anti-friction material more firmly in place, but it is preferable that the mode of attachment be such that a molecular coalescence is effected between the metals of the stub teeth and the anti-friction facing.

Various modifications of the construction illustrated may be made by those skilled in the art without departure from the invention.

Claims:

1. A gear having a center of comparatively strong metal, having stub teeth thereon which are faced with a comparatively weaker anti-friction material which is united with the metal of said stub teeth.

2. A gear having a center of comparatively strong metal, having stub teeth thereon and faced with comparatively weak anti-friction material which is amalgamated with the said comparatively strong metal.

3. A gear having a center of iron having stub teeth formed thereon and coated with a bronze composition which is integrally united with the stub teeth.

4. A gear having a center of iron having stub teeth formed thereon and coated with a bronze composition in such a manner that there is a molecular coalescence between the metals of said stub teeth and the coating.

5. A gear having a center of comparatively strong metal, having stub teeth thereon and faced with comparatively weak anti-friction material to form a good bearing surface, said anti-friction material being plated thereon and extending unbrokenly around the circumference of the center.

In witness whereof I have hereunto signed my name.

CHARLES H. CALKINS.